Patented Dec. 23, 1952

2,623,026

UNITED STATES PATENT OFFICE 2,623,026

COATING COMPOSITIONS FOR FLOORS AND THE LIKE

Thomas J. Bagley, Haddonfield, N. J., assignor to R. M. Hollingshead Corporation, Camden, N. J., a corporation of New Jersey No Drawing. Application November 1, 1950, Serial No. 193,537

1 Claim. (Cl. 260—27)

This invention relates to coating compositions and more particularly to aqueous dispersions of mixtures of resins and synthetic rubber.

Heretofore coating compositions for use on floors and the like have been proposed consisting essentially of resins of various types either alone or in admixture dispersed in water. Such resin dispersions have not been entirely satisfactory under actual conditions of use since the dried film lacks resilience and scuff resistance.

The principal object of the present invention is to provide a coating consisting primarily of an aqueous dispersion of a resin or resins with an additional components for improving the scuff resistant qualities of such coating and at the same time providing good lay-down characteristics.

A further object of the present invention is to provide an aqueous coating composition, the solids contents of which consist primarily of a suitable resin with a minor proportion of synthetic rubber, the mixture being dispersed in water.

A further object of the present invention is to provide an aqueous dispersion of a mixture of a resin and a synthetic rubber to provide a coating having improved scuff resistance properties, as compared to aqueous dispersions of resins or mixtures thereof heretofore known to the art.

These objects are accomplished by forming a dispersion in water of a mixture consisting of a natural resin such as shellac, esterified gum, esterified terpene or a synthetic resin such as "Durez," "Arochem," alkyd resin or a phenolic resin with a synthetic rubber such as:

| Trade Name | Manufacturer | Chemical Type |
|---|---|---|
| Buna-N | I. G. Farbenindustrie of Germany. | Butadiene-acrylonitrile copolymer. |
| Buna-S | do | Butadiene-styrene copolymer. |
| "Chemigum" | Goodyear Tire & Rubber Co. | Butadiene-acrylonitrile polymer. |
| "Pliolite" | do | Butadiene-styrene copolymer. |
| "Ameripol" | B. F. Goodrich | Butadiene-acrylonitrile copolymer. |
| "Butaprene" | Firestone Tire & Rubber Co. | Do. |
| "Hycar" | Hycar Chemical Company | Do. |
| "Neoprene" | du Pont Co. | Polymerized 2-chloro-1,3 butadiene. |
| "Perbunan" | Standard Oil Co. | Butadiene-acrylonitrile copolymer. |
| "Thiokol" | Thiokol Corporation | Olefin polysulfide reaction product. |

The dispersion of the resin-rubber mixture is brought about by the use of suitable agents such as ammonia and also synthetic dispersants commercially known as Tergitols which comprise a group of wetting agents that markedly reduce the surface tension of water solutions, even under conditions of high dilution. They are sulfates and phosphates of a series of higher synthetic alcohols ranging in carbon content from 8 to 17 atoms. Various amines such as monoethanolamine may also be used. In the above list of resins "Durez" refers to a group of oil soluble resins manufactured by Durez Plastics & Chemicals, Inc. These are phenolic resins including phenol-formaldehyde resin and terpene phenolic resin. "Arochem" refers to a group of synthetic resins of the rosin modified type with the exception of ester gum and the rosin modified phthalic alkyd resins manufactured by U. S. Industrial Chemicals, Inc.

The following example is given to illustrate a preferred embodiment of the present invention, although it will be understood that this preferred example is given merely by way of illustration and not by way of limitation:

|  | Percent by weight |
|---|---|
| Esterified terpene | 6.0 |
| Shellac | 3.4 |
| "Durez" (terpene phenolic resin) | 3.4 |
| Pliolite 170 (30% solids) (butadiene-styrene copolymer) | 4.0 |
| Ammonia | 1.4 |
| Sulfates and phosphates of a series of higher synthetic alcohols ranging in carbon content from 8 to 17 atoms | 0.9 |
| Water, balance to 100% | |

In forming the dispersion of the present invention from the above ingredients the resin and the synthetic rubber are added to the specified quantity of water and the ammonia and "Tergitol" dispersant are then added and the mixture thoroughly stirred. The resulting dispersion is creamy in color resembling a self-polishing wax and when applied to a surface such as a floor leaves a resilient film having a high gloss and having substantial resistance to scuffing.

Various relative proportions of resin and synthetic rubber can be used in the practice of the present invention provided that the resin is present in substantially larger amounts than the synthetic rubber. Best results are obtained when the percentage of synthetic rubber in the resin-rubber mixture is held between the limits of 2%–20%, the balance being a resin or a mixture of resins, either natural or synthetic or both.

The resin is thus present in an amount ranging from 4 to 49 times the amount of synthetic rubber by weight. By using an amount of synthetic rubber which is relatively small as compared to the amount of resin, I have found that it is possible to modify the characteristics of the resin in such a way as to obtain an altered film on the surface being coated. These results are not obtained if the relative proportion of synthetic rubber is substantially higher than stated above and it should be particularly noted that the benefits of the present invention are not obtained if the amount of rubber is equal to or greater than the amount of resin. The benefits of the invention are obtained by the joint contribution of the resin and synthetic rubber in the range stated to provide a dried film of the desired characteristics. These results are particularly surprising in view of the fact that the final results as exhibited by the dried film are not obtained in aqueous dispersions of either resins or rubber alone. The specific ingredients referred to above may be varied within the range indicated and it will also be understood that equivalent materials may be substituted both for the resin, the synthetic rubber and the dispersing material.

I claim:

A liquid floor coating composition comprising an aqueous dispersion consisting essentially of a mixture of a shellac, a terpene phenolic resin, a synthetic rubber selected from the class consisting of the (1) organic dihalide-inorganic polysulfide, (2) butadiene-acrylonitrile, and (3) butadiene-styrene copolymers, and a dispersing agent consisting essentially of a salt selected from the class consisting of the sulfates and phosphates of the higher saturated alcohol having an alkyl group consisting of from 8 to 17 carbon atoms, and the balance water, the total amount of said combined shellac and terpene phenolic resin being from 4 to 49 times the amount of synthetic rubber by weight.

THOMAS J. BAGLEY.

REFERENCES CITED

The following references are of record in the file of this patent:

UNITED STATES PATENTS

| Number | Name | Date |
|---|---|---|
| 2,336,484 | Klinkenstein et al. | Dec. 14, 1943 |
| 2,400,054 | Robinson et al. | May 7, 1946 |
| 2,493,798 | Abernathy et al. | Jan. 10, 1950 |